(12) United States Patent
Yamashita Hagino et al.

(10) Patent No.: US 12,473,510 B2
(45) Date of Patent: Nov. 18, 2025

(54) GREASE COMPOSITION AND STEERING GEAR DEVICE

(71) Applicant: JTEKT CORPORATION, Kariya (JP)

(72) Inventors: Yurie Yamashita Hagino, Kashihara (JP); Hiroki Tanaka, Kashihara (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/729,688

(22) PCT Filed: Jun. 17, 2022

(86) PCT No.: PCT/JP2022/024321
§ 371 (c)(1),
(2) Date: Jul. 17, 2024

(87) PCT Pub. No.: WO2023/148995
PCT Pub. Date: Aug. 10, 2023

(65) Prior Publication Data
US 2025/0101335 A1    Mar. 27, 2025

(30) Foreign Application Priority Data

Feb. 1, 2022   (WO) ................. PCT/JP2022/003775

(51) Int. Cl.
*C10M 169/04*    (2006.01)
*F16H 57/04*    (2010.01)
(Continued)

(52) U.S. Cl.
CPC ....... *C10M 169/04* (2013.01); *F16H 57/0464* (2013.01); *B62D 3/12* (2013.01);
(Continued)

(58) Field of Classification Search
CPC ........ C10M 169/04; C10M 2205/0285; C10M 2207/1285; C10M 2207/2855;
(Continued)

(56) References Cited

U.S. PATENT DOCUMENTS 5,714,444 A * 2/1998 Yokouchi ............. C10M 105/38
508/463
6,444,621 B1   9/2002 Okaniwa et al.
(Continued)

FOREIGN PATENT DOCUMENTS

CN    104371796 A    2/2015
CN    113528221 A   10/2021
(Continued)

OTHER PUBLICATIONS

Apr. 23, 2025 Extended European Search Report issued in European Patent Application No. 22924900.8.
(Continued)

*Primary Examiner* — Ellen M McAvoy
(74) *Attorney, Agent, or Firm* — Oliff PLC

(57) ABSTRACT

A grease composition includes a base oil, a thickener, and an extreme pressure additive. The base oil contains trimellitate ester and poly-α-olefin. A proportion of the trimellitate ester to a total amount of the trimellitate ester and the poly-α-olefin is 10.0 mass % or more and 60.0 mass % or less. The thickener contains lithium 12-hydroxystearate and lithium stearate. A proportion of the lithium 12-hydroxystearate to a total amount of the lithium 12-hydroxystearate and the lithium stearate is 5.0 mass % or more and 95.0 mass % or less. The extreme pressure additive contains molybdenum dialkyl dithiocarbamate. A proportion of the molybdenum dialkyl dithiocarbamate to a total amount of the trimellitate ester, the poly-a-olefin, the lithium 12-hydroxystearate, the lithium stearate, and the molybdenum dialkyl dithiocarbamate is 0.6 mass % or more and 16.0 mass % or less.

4 Claims, 6 Drawing Sheets

(51) Int. Cl.
*B62D 3/12* (2006.01)
*C10N 30/06* (2006.01)
*C10N 40/04* (2006.01)
*C10N 50/10* (2006.01)

(52) U.S. Cl.
CPC ............ *C10M 2205/0285* (2013.01); *C10M 2207/1285* (2013.01); *C10M 2207/2855* (2013.01); *C10M 2219/068* (2013.01); *C10N 2030/06* (2013.01); *C10N 2040/04* (2013.01); *C10N 2050/10* (2013.01)

(58) Field of Classification Search
CPC ........ C10M 2219/068; C10M 169/044; C10M 2207/285; C10M 2213/062; F16H 57/0464; B62D 3/12; C10N 2030/06; C10N 2040/04; C10N 2050/10
See application file for complete search history.

(56) References Cited

U.S. PATENT DOCUMENTS

| | | | |
|---|---|---|---|
| 2013/0012416 A1* | 1/2013 | Fujinami | C10M 169/02 508/519 |
| 2014/0045733 A1* | 2/2014 | Nogami | C10M 141/12 508/378 |
| 2016/0201726 A1* | 7/2016 | Watabe | C10M 117/04 384/462 |
| 2017/0321143 A1* | 11/2017 | Egersdorfer | C10M 105/36 |
| 2017/0327760 A1* | 11/2017 | Egersdorfer | C10M 169/00 |
| 2019/0300813 A1* | 10/2019 | Shishikura | C10M 169/02 |

FOREIGN PATENT DOCUMENTS

| | | |
|---|---|---|
| JP | H11-131082 A | 5/1999 |
| JP | 2001-064665 A | 3/2001 |
| JP | 2004-269722 A | 9/2004 |
| JP | 2006-335102 A | 12/2006 |
| JP | 2009-203374 A | 9/2009 |
| JP | 2012-102191 A | 5/2012 |

OTHER PUBLICATIONS

Aug. 30, 2022 International Search Report issued in International Patent Application No. PCT/JP2022/024321.

Apr. 5, 2022 International Search Report issued in International Patent Application No. PCT/JP2022/003775.

* cited by examiner

GREASE COMPOSITION AND STEERING GEAR DEVICE

TECHNICAL FIELD

The present disclosure relates to a grease composition and a steering gear device.

This application claims priority based on the international application No. PCT/JP2022/003775 filed on Feb. 1, 2022, and incorporates all contents described in the above international application.

BACKGROUND ART

A rack and pinion provided in a steering gear device for use in an electric power steering system include a rack shaft having rack teeth and a pinion shaft having pinion teeth. In this steering gear device, wear of the rack teeth and the pinion teeth is suppressed by applying grease to a meshing portion between the rack teeth and the pinion teeth. This reduces the amount of change in the clearance between the rack teeth and the pinion teeth, thereby maintaining the steering performance of the electric power steering system. Greases for use in steering gear devices are proposed in, for example, Patent Documents 1 to 3.

RELATED ART DOCUMENTS

Patent Documents

Patent Document 1: Japanese Unexamined Patent Application Publication No. 2001-064665 (JP 2001-064665 A)
Patent Document 2: Japanese Unexamined Patent Application Publication No. 2009-203374 (JP 2009-203374 A)
Patent Document 3: Japanese Unexamined Patent Application Publication No. 2004-269722 (JP 2004-269722 A)

SUMMARY OF THE INVENTION

A grease composition according to one aspect of the present disclosure includes a base oil, a thickener, and an extreme pressure additive. The base oil contains trimellitate ester and poly-α-olefin. A proportion of the trimellitate ester to a total amount of the trimellitate ester and the poly-α-olefin is 10.0 mass % or more and 60.0 mass % or less. The thickener contains lithium 12-hydroxystearate and lithium stearate. A proportion of the lithium 12-hydroxystearate to a total amount of the lithium 12-hydroxystearate and the lithium stearate is 5.0 mass % or more and 95.0 mass % or less. The extreme pressure additive contains molybdenum dialkyl dithiocarbamate. A proportion of the molybdenum dialkyl dithiocarbamate to a total amount of the trimellitate ester, the poly-α-olefin, the lithium 12-hydroxystearate, the lithium stearate, and the molybdenum dialkyl dithiocarbamate is 0.6 mass % or more and 16.0 mass % or less.

A steering gear device according to one aspect of the present disclosure includes: a housing; a rack shaft including rack teeth and configured to reciprocate along an axial direction; a pinion shaft including pinion teeth that mesh with the rack teeth; a rack guide mechanism that urges the rack teeth against the pinion teeth; and a grease composition applied between the rack teeth and the pinion teeth that mesh with each other, and between a peripheral face of the rack shaft and a portion of the rack guide mechanism that is pressed against the rack shaft. The grease composition is the grease composition of the present disclosure.

MODES FOR CARRYING OUT THE INVENTION

Figure 1:
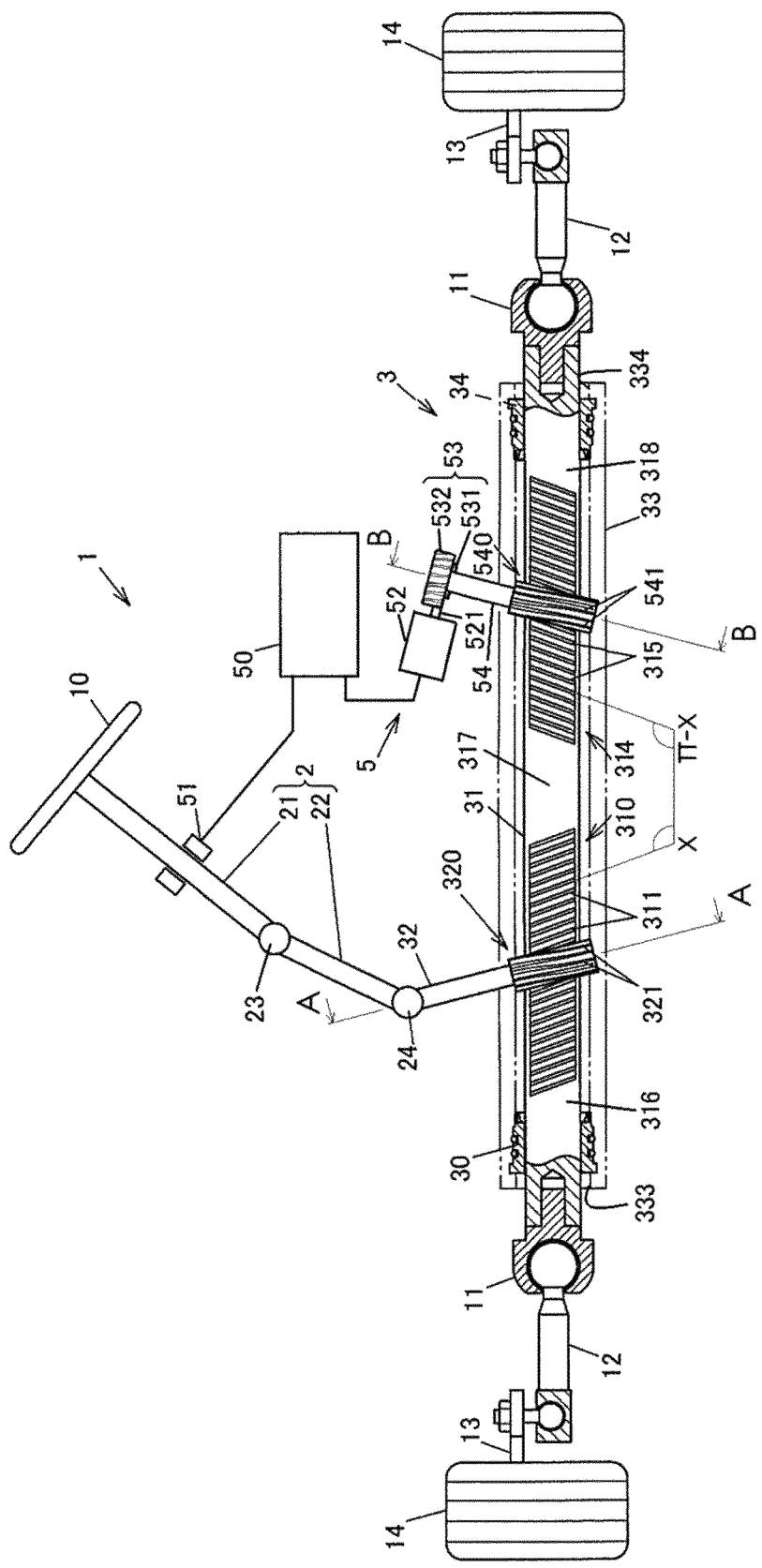
FIG. 1 is a configuration diagram schematically illustrating an example of a dual-pinion type electric power steering system in which a grease composition of the present disclosure is sealed.

<Problems to be Solved by the Invention of the Present Disclosure>

In a steering gear device including a rack and pinion, wear of rack teeth and pinion teeth of the rack and pinion is suppressed by applying a grease composition to a meshing portion between the rack teeth and the pinion teeth. The above steering gear device includes a rack guide mechanism for urging the rack teeth against the pinion teeth, and a grease composition is also applied between a rack shaft and a portion of the rack guide mechanism that is pressed against the rack shaft to suppress wear of them.

Therefore, in the above steering gear device, there is a demand for a grease composition that can satisfactorily lubricate not only the meshing portion between the rack teeth and the pinion teeth of the rack and pinion but also the sliding contact portion between the rack shaft and the rack guide mechanism.

However, it has been difficult for the grease compositions proposed in Patent Documents 1 to 3 to fully meet such a demand.

The meshing portion between the rack teeth and the pinion teeth and the sliding contact portion between the rack shaft and the rack guide mechanism are lubricated portions that are prone to poor lubrication. It has not been easy to lubricate such portions satisfactorily.

The portion of the rack guide mechanism that is pressed against the rack shaft is made of a resin such as PTFE, and a grease composition designed for lubricating the meshing portion between the steel rack teeth and the steel pinion teeth has sometimes been unable to satisfactorily lubricate the sliding contact portion between the rack shaft and the rack guide mechanism.

<Effects of the Invention of the Present Disclosure>

The grease composition of the present disclosure is easily adsorbed to the friction face of a lubricated member and easily remains on the friction face by forming a tribo-reaction film. Therefore, the grease composition exhibits excellent lubricating performance even when used in portions prone to poor lubrication, and can suppress wear on the friction face of the lubricated member. Therefore, the grease composition is suitable for use in the steering gear device including the rack and pinion.

Since the steering gear device of the present disclosure uses the grease composition of the present disclosure, it is possible to suppress wear over a long period of time on the rack teeth and the pinion teeth, the peripheral face of the rack shaft that comes into sliding contact with the rack guide mechanism, and the portion of the rack guide mechanism that is pressed against the rack shaft. Therefore, the above steering gear device can maintain the steering performance for a long period of time.

<Overview of Embodiments of the Invention of the Present Disclosure>

Hereinafter, an overview of embodiments of the invention of the present disclosure will be described on a list.

(1) A grease composition of the present disclosure includes a base oil, a thickener, and an extreme pressure additive. The base oil contains trimellitate ester and poly-a-olefin. A proportion of the trimellitate ester to a total amount of the trimellitate ester and the poly-a-olefin is 10.0 mass % or more and 60.0 mass % or less. The thickener contains lithium 12-hydroxystearate and lithium stearate. A proportion of the lithium 12-hydroxystearate to a total amount of the lithium 12-hydroxystearate and the lithium stearate is 5.0 mass % or more and 95.0 mass % or less. The extreme pressure additive contains molybdenum dialkyl dithiocarbamate. A proportion of the molybdenum dialkyl dithiocarbamate to a total amount of the trimellitate ester, the poly-α-olefin, the lithium 12-hydroxystearate, the lithium stearate, and the molybdenum dialkyl dithiocarbamate is 0.6 mass % or more and 16.0 mass % or less.

The grease composition is easily adsorbed to the friction face of a lubricated member and is unlikely to be desorbed from the friction face because the base oil contains predetermined amounts of trimellitate ester and poly-α-olefin and the thickener contains predetermined amounts of lithium stearate and lithium 12-hydroxystearate.

In addition, a tribo-reaction film is easily formed on the friction face because the grease composition contains a predetermined amount of molybdenum dialkyl dithiocarbamate as the extreme pressure additive.

Therefore, the grease composition is suitable for lubricating the friction face of the lubricated member prone to be in a poor lubrication environment, and for suppressing wear of the friction face.

(2) In the grease composition of (1) above, the proportion of the molybdenum dialkyl dithiocarbamate to the total amount of the trimellitate ester, the poly-a-olefin, the lithium 12-hydroxystearate, the lithium stearate, and the molybdenum dialkyl dithiocarbamate is preferably 1.3 mass % or more and 8.3 mass % or less.

In this case, the grease composition is more suitable for achieving both suppression of wear of the friction face of a lubricated member made of steel and suppression of wear of the friction face of a lubricated member made of resin.

(3) A steering gear device of the present disclosure includes: a housing; a rack shaft including rack teeth and configured to reciprocate along an axial direction; a pinion shaft including pinion teeth that mesh with the rack teeth; a rack guide mechanism that urges the rack teeth against the pinion teeth; and a grease composition applied between the rack teeth and the pinion teeth that mesh with each other, and between a peripheral face of the rack shaft and a portion of the rack guide mechanism that is pressed against the rack shaft. The grease composition is the grease composition of the present disclosure.

In the steering gear device, the grease composition applied between the rack teeth and the pinion teeth that mesh with each other and between the peripheral face of the rack shaft and the portion of the rack guide mechanism that is pressed against the rack shaft is the grease composition of the present disclosure. In this case, wear is suppressed on the rack teeth, the pinion teeth, the peripheral face of the rack shaft that comes into sliding contact with the rack guide mechanism, and the portion of the rack guide mechanism that is pressed against the rack shaft. Therefore, the amount of change in the clearance in the lubricated portion due to wear is small, and a decrease in steering performance etc. is less likely to occur.

<Details of Embodiments of the Invention of the Present Disclosure>

Embodiments of the present disclosure will be described below.

In the present disclosure, the embodiments of the invention should be understood as being exemplary in all respects and not restrictive. The scope of rights of the present invention is set forth in the claims, and is intended to include all modifications within the meaning and scope equivalent to the claims.

First, a steering gear device using the grease composition of the present disclosure will be described, followed by description of embodiments relating to the grease composition of the present disclosure.

The grease composition of the present disclosure is used in, for example, dual-pinion type electric power steering systems and column type electric power steering systems.

(Dual-Pinion Type Electric Power Steering System)

FIG. 1 is a configuration diagram schematically illustrating an example of a dual-pinion type electric power steering system 1 including a steering gear device 3.

Figure 2:
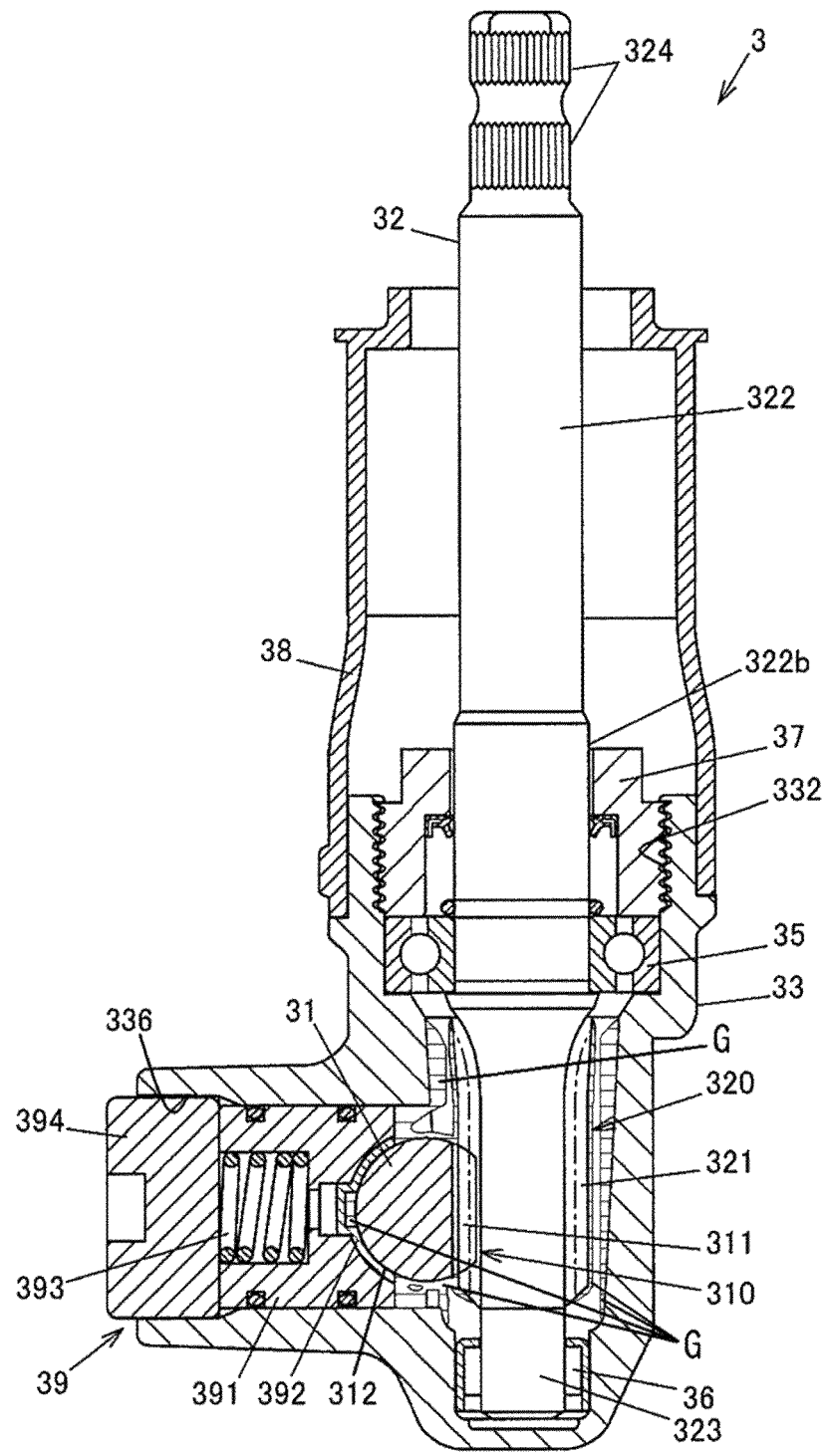
FIG. 2 is a sectional view taken along A-A in FIG. 1.

FIG. 2 is a sectional view taken along A-A in FIG. 1, illustrating part of the steering gear device 3. In FIG. 2, a lower side of the drawing corresponds to a lower side in a vertical direction when installed in a vehicle.

Figure 3:
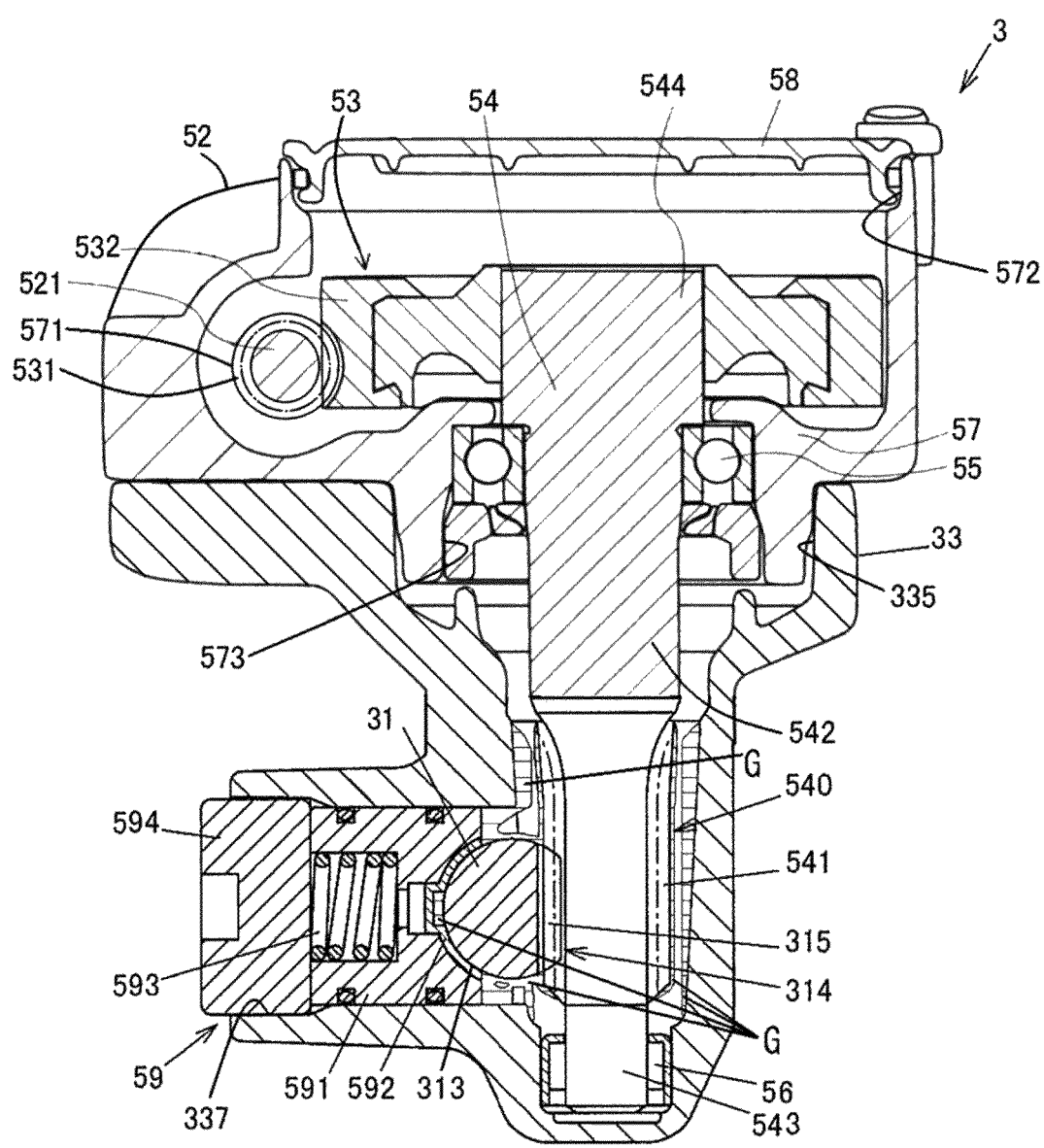
FIG. 3 is a sectional view taken along B-B in FIG. 1.

FIG. 3 is a sectional view taken along B-B in FIG. 1, illustrating part of the steering gear device 3. In FIG. 3, a lower side of the drawing corresponds to the lower side in the vertical direction when installed in the vehicle.

The dual-pinion type electric power steering system 1 includes a steering wheel 10, a steering shaft 2, a first pinion shaft 32, a rack shaft 31, a housing 33, two rack bushings 30 and 34, two bearings 35 and 36, a first rack guide mechanism 39, and a steering assistance device 5. The steering assistance device 5 includes a controller 50, a torque sensor 51, an electric motor 52, a speed reducing mechanism 53, a second pinion shaft 54, two bearings 55 and 56, a worm housing 57, and a second rack guide mechanism 59. The speed reducing mechanism 53 includes a worm 531 and a worm wheel 532.

A driver who drives an automobile including the dual-pinion type electric power steering system 1 performs steering operations by turning the steering wheel 10. The steering shaft 2 includes a column shaft 21, a first universal joint 23, an intermediate shaft 22, and a second universal joint 24. The first universal joint 23 includes a first yoke that is omitted from illustration, a plurality of first rolling elements that is omitted from illustration, a first joint spider that is omitted from illustration, a plurality of second rolling elements that is omitted from illustration, and a second yoke that is omitted from illustration. The second universal joint 24 includes a third yoke that is omitted from illustration, a plurality of third rolling elements that is omitted from illustration, a second joint spider that is omitted from illustration, a plurality of fourth rolling elements that is omitted from illustration, and a fourth yoke that is omitted from illustration.

The column shaft 21 fixes the steering wheel 10 at one end thereof in an extending direction. The column shaft 21 fixes the first yoke of the first universal joint 23 at the other end thereof in the extending direction. The column shaft 21 is rotatable about a central axis in the extending direction. The first yoke is pivotably fitted to a first pair of trunnions located on the same central axis of the first joint spider via the plurality of first rolling elements. The second yoke is pivotably fitted to a second pair of trunnions located on the same central axis of the first joint spider via the plurality of second rolling elements. The central axes of the first pair of trunnions and the central axes of the second pair of trunnions intersect at an angle of 90 degrees.

The second yoke of the first universal joint 23 fixes one end of the intermediate shaft 22 in the extending direction thereof. The intermediate shaft 22 fixes the third yoke of the second universal joint 24 at the other end thereof in the extending direction. The third yoke is pivotably fitted to a third pair of trunnions located on the same central axis of the second joint spider via the plurality of third rolling elements. The fourth yoke is pivotably fitted to a fourth pair of trunnions located on the same central axis of the second joint spider via the plurality of fourth rolling elements. The central axes of the third pair of trunnions and the central axes of the fourth pair of trunnions intersect at an angle of 90 degrees. The fourth yoke of the second universal joint 24 fixes one end of the first pinion shaft 32 in the extending direction thereof. Thus, when the driver turns the steering wheel 10, the column shaft 21 turns about the central axis thereof in the extending direction thereof, the intermediate shaft 22 also turns about a central axis thereof in the extending direction thereof, and the first pinion shaft 32 also turns about a central axis thereof in the extending direction thereof.

In the dual-pinion type electric power steering system 1, the first pinion shaft 32, the rack shaft 31, the housing 33, the two rack bushings 30 and 34, the first bearing 35, the second bearing 36, the first rack guide mechanism 39, the electric motor 52, the speed reducing mechanism 53, the second pinion shaft 54, the third bearing 55, the fourth bearing 56, the worm housing 57, and the second rack guide mechanism 59 constitute the steering gear device 3 that serves as a rack and pinion type steering device. In FIG. 1, the housing 33 is represented by a hidden outline (long dashed double-short dashed lines), and inside thereof is illustrated.

The first pinion shaft 32 extends from an upper side to a lower side of the automobile in the vertical direction. The first pinion shaft 32 includes, from one end side toward the other end in the extending direction thereof, a serrated portion 324, a first shaft portion 322, a first pinion toothed portion 320, and a first boss portion 323. Serrations are formed in the serrated portion 324. The fourth yoke of the second universal joint 24 is fixed to the serrations of the serrated portion 324. The first shaft portion 322 has a columnar shape. First pinion teeth 321 are formed over the entire face of the first pinion toothed portion 320 in the circumferential direction. An extending direction of the first pinion teeth 321 has an angle that is not 90 degrees with respect to the extending direction of the central axis of the first pinion shaft 32. The first boss portion 323 has a columnar shape.

The housing 33 has a first opening 332 on the steering wheel 10 side, and a side opposite to the first opening 332 is sealed off. The first pinion shaft 32 is accommodated within the housing 33. The first pinion shaft 32 is supported by the two bearings 35 and 36 so as to be rotatable relative to the housing 33. The first bearing 35 is a ball bearing. The first bearing 35 includes an inner ring, an outer ring, and balls, with the inner ring being fixed to the first shaft portion 322 and also the outer ring being fixed to the housing 33, and the balls roll between the inner ring and the outer ring. The second bearing 36 is a roller bearing. The second bearing 36 includes rollers and an outer ring, with the outer ring being fixed to the housing 33, and the rollers roll between an outer peripheral face of the first boss portion 323 and the outer ring.

A lid 37 through which the first pinion shaft 32 passes is fixed to the first opening 332 of the housing in a state in which the first pinion shaft 32, the first bearing 35, and the second bearing 36 are inserted into the housing 33. A seal is fixed to the lid 37, and the seal is slidable on an outer peripheral face 322b of the first shaft portion 322 of the first pinion shaft 32. A cover member 38 is further fixed to the housing 33. The cover member 38 covers part of the first shaft portion 322 of the first pinion shaft 32 from the outside in a radial direction.

The rack shaft 31 includes, from one end toward the other end in an extending direction thereof, a first columnar portion 316, a first rack toothed portion 310, a second columnar portion 317, a second rack toothed portion 314, and a third columnar portion 318. The first rack toothed portion 310 has first rack teeth 311 formed on part thereof in the circumferential direction, and the other part thereof in the circumferential direction is a cylindrical face 312 having a central axis corresponding to the extending direction of the rack shaft 31. The second rack toothed portion 314 has second rack teeth 315 formed on part thereof in the circumferential direction, and the other part thereof in the circumferential direction is a cylindrical face 313 having a central axis corresponding to the extending direction of the rack shaft 31. An outer peripheral face of the first columnar portion 316, an outer peripheral face of the second columnar portion 317, and an outer peripheral face of the third columnar portion 318 are each a cylindrical face having a central axis corresponding to the extending direction of the rack shaft 31. The extending direction of the first rack teeth 311 has an angle that is not 90 degrees with respect to the extending direction of the rack shaft. The extending direction of the second rack teeth 315 has an angle that is not 90 degrees with respect to the extending direction of the rack shaft 31. Assuming that the angle of the first rack teeth 311 with respect to the extending direction of the rack shaft 31 is X, the angle of the second rack teeth 315 with respect to the extending direction of the rack shaft 31 is η-X.

The housing 33 extends in a direction different from that of the first opening 332 on the steering wheel 10 side, and has a second opening 333 at one end in the extending direction and a third opening 334 at the other end in the extending direction. The rack shaft 31 is accommodated within the housing 33 along the extending direction of the housing 33. The first columnar portion 316 at one end of the rack shaft 31 in the extending direction thereof protrudes from the second opening 333 at one end of the housing 33 in the extending direction thereof. The third columnar portion 318 at the other end of the rack shaft 31 in the extending direction thereof protrudes from the third opening 334 at the other end of the housing 33 in the extending direction thereof. The housing 33 has a fourth opening 335. The fourth opening 335 is located closer to the other end of the housing in the extending direction than the first opening 332 is. The housing 33 further has a fifth opening 336 and a sixth opening 337. The fifth opening 336 is located at approximately the same position as that of the first opening 332 in the extending direction of the housing 33 to extend in a radial direction about a central axis corresponding to the extending direction of the housing 33, that is, in a direction perpendicular to the first opening 332. The sixth opening 337 is located at approximately the same position as that of the fourth opening 335 in the extending direction of the housing 33 to extend in a radial direction about a central axis corresponding to the extending direction of the housing 33, that is, in a direction perpendicular to the fourth opening 335.

The first rack bushing 30 is fixed to one end of the housing 33 in the extending direction. The first rack bushing 30 is fixed to the housing 33 to adjoin the second opening 333. The first rack bushing 30 is slidable on the outer peripheral face of the first columnar portion 316 of the rack shaft 31. The second rack bushing 34 is fixed to the other end of the housing 33 in the extending direction. The second rack bushing 34 is fixed to the housing 33 to adjoin the third opening 334. The second rack bushing 34 is slidable on the outer peripheral face of the third columnar portion 318 of the rack shaft 31.

The first pinion teeth 321 formed on the first pinion toothed portion 320 of the first pinion shaft 32 and the first rack teeth 311 formed on the first rack toothed portion 310 of the rack shaft 31 are in contact with each other so as to be rolling-slidable via a grease composition G. The first pinion teeth 321 and the first rack teeth 311 mesh with each other via the grease composition G. When the first pinion shaft 32 turns relative to the housing 33 about the central axis in the extending direction thereof, the rack shaft 31 moves in a linear direction relative to the housing 33 in the extending direction of the housing 33.

The first rack guide mechanism 39 is fixed to the housing 33. The first rack guide mechanism 39 is fixed to the fifth opening 336. The fifth opening 336 is located on the cylindrical face 312 side that is the other part of the first rack toothed portion 310 of the rack shaft 31 in the circumferential direction at a position where the first pinion shaft 32 meshes with the rack shaft 31 in the extending direction of the housing 33.

The first rack guide mechanism 39 includes a first support yoke 391, a first sheet member 392, a first coil spring 393, and a first plug 394. The first sheet member 392 is interposed between the cylindrical face 312 that is the other part of the first rack toothed portion 310 of the rack shaft 31 in the circumferential direction and the cylindrical face of the first support yoke 391. The first sheet member 392 is fixed to the first support yoke 391. The first sheet member 392 and the cylindrical face 312 that is the other part of the first rack toothed portion 310 of the rack shaft 31 in the circumferential direction are in contact with each other so as to be slidable via the grease composition G. The first sheet member 392 includes a metal layer of, for example, bronze and a resin layer of, for example, PTFE, and the resin layer is in contact with the cylindrical face 312 via the grease composition G. The first plug 394 is fixed to the fifth opening 336 of the housing 33. The first plug 394 is in contact with one end of the first coil spring 393. The first support yoke 391 is in contact with the other end of the first coil spring 393. The first coil spring 393 is shorter than a free length thereof in a state in which the first plug 394 is fixed to the fifth opening 336. Thus, the first sheet member 392 is pressed against the rack shaft 31 with respect to the housing 33.

The second pinion shaft 54 extends from the upper side to the lower side of the automobile in the vertical direction. The second pinion shaft 54 includes, from one end side toward the other end along the extending direction thereof, a fitting portion 544, a second shaft portion 542, a second pinion toothed portion 540, and a second boss portion 543. The fitting portion 544 has a columnar shape. The second shaft portion 542 has a columnar shape. Second pinion teeth 541 are formed over the entire face of the second pinion toothed portion 540 in the circumferential direction. An extending direction of the second pinion teeth 541 has an angle that is not 90 degrees with respect to the extending direction of the central axis of the second pinion shaft 54. The second boss portion 543 has a columnar shape.

The worm wheel 532 is fitted to the fitting portion 544. The worm 531 is fixed to an output shaft 521 of the electric motor 52. The electric motor 52 is fixed to the worm housing 57. The worm housing 57 has a seventh opening 571. The output shaft 521 of the electric motor 52 is disposed in internal space of the worm housing 57 via the seventh opening 571. The electric motor 52 is fixed to the worm housing 57 so as to close off the seventh opening 571 of the worm housing 57.

The worm 531 is disposed in the internal space of the worm housing 57. The worm wheel 532 is disposed in the internal space of the worm housing 57. The worm housing 57 has an eighth opening 572 vertically upward, and an assembly of the second pinion shaft 54 and the worm wheel 532 is inserted into the internal space of the worm housing 57 from the eighth opening 572. The eighth opening is closed with a lid 58. The worm housing 57 has a ninth opening 573 on the opposite side from the eighth opening 572. Part of the second shaft portion 542 of the second pinion shaft 54, the second pinion toothed portion 540, and the second boss portion 543 protrude from the ninth opening 573 of the worm housing 57.

The worm housing 57 is fixed to the housing 33. The ninth opening 573 of the worm housing 57 and the fourth opening 335 of the housing 33 communicate with each other to seal off the internal space from the external space.

The third bearing 55 is a ball bearing. The bearing 55 includes an inner ring, an outer ring, and balls, with the inner ring being fixed to the second shaft portion 542 and also the outer ring being fixed to the worm housing 57, and the balls roll between the inner ring and the outer ring. The bearing 56 is a roller bearing. The bearing 56 includes rollers and an outer ring, with the outer ring being fixed to the housing 33, and the rollers roll between an outer peripheral face of the second boss portion 543 and the outer ring.

The second pinion teeth 541 formed on the second pinion toothed portion 540 of the second pinion shaft 54 and the second rack teeth 315 formed on the second rack toothed portion 314 of the rack shaft 31 are in contact with each other so as to be rolling-slidable via the grease composition G. The second pinion teeth 541 and the second rack teeth 315 mesh with each other via the grease composition G. When the second pinion shaft 54 turns relative to the housing 33 about the central axis in the extending direction thereof, the rack shaft 31 moves in the linear direction relative to the housing 33 in the extending direction of the housing 33.

The second rack guide mechanism 59 is fixed to the housing 33. The second rack guide mechanism 59 is fixed to the sixth opening 337. The sixth opening 337 is located on the cylindrical face 313 side that is the other part of the second rack toothed portion 314 of the rack shaft 31 in the circumferential direction at a position where the second pinion shaft 54 meshes with the rack shaft 31 in the extending direction of the housing 33.

The second rack guide mechanism 59 includes a second support yoke 591, a second sheet member 592, a second coil spring 593, and a second plug 594. The second sheet member 592 is interposed between the cylindrical face 313 that is the other part of the second rack toothed portion 314 of the rack shaft 31 in the circumferential direction and the cylindrical face of the second support yoke 591. The second sheet member 592 is fixed to the second support yoke 591. The second sheet member 592 and the cylindrical face 313 that is the other part of the second rack toothed portion 314 of the rack shaft 31 in the circumferential direction are in contact with each other so as to be slidable via the grease composition G. The second sheet member 592 includes a metal layer of, for example, bronze and a resin layer of, for example, PTFE, and the resin layer is in contact with the cylindrical face 313 via the grease composition G. The second plug 594 is fixed to the sixth opening 337 of the housing 33. The second plug 594 is in contact with one end of the second coil spring 593. The second support yoke 591 is in contact with the other end of the second coil spring 593. The second coil spring 593 is shorter than a free length thereof in a state in which the second plug 594 is fixed to the sixth opening 337. Thus, the second sheet member 592 is pressed against the rack shaft 31 with respect to the housing 33.

The torque sensor 51 detects steering torque applied by the driver to the steering wheel 10 through the column shaft 21. The speed reducing mechanism 53 is an assembly in which the worm 531 that rotates together with the output shaft 521 of the electric motor 52 and the worm wheel 532 that rotates together with the second pinion shaft 54 mesh with each other. A motor current is supplied to the electric motor 52 from the controller 50. The controller 50 controls the electric motor 52 based on the steering torque detected by the torque sensor 51, vehicle speed, etc., and transmits, to the second pinion shaft 54, rotational force of the output shaft 521 of the electric motor 52 that is reduced in speed by the speed reducing mechanism 53. The rotational force of the second pinion shaft 54 is applied from the second pinion teeth 541 to the second rack teeth 315 as a steering assisting force.

The housing 33 is fixed to the automobile that is omitted from illustration, with the extending direction of the housing 33 aligned with a vehicle-width direction. Ball joint sockets 11, 11 are fixed to one end and the other end of the rack shaft 31, respectively, and tie rods 12, 12 connected to the ball joint sockets 11, 11, respectively, are connected to bearing rings of rolling bearings that rotatably support a pair of right and left front wheels 14, 14 via knuckle arms 13, 13. The linear movement of the rack shaft 31 in the extending direction of the housing 33 steers the right and left front wheels 14, 14 that are steered wheels.

The grease composition G is sealed within the housing 33. The grease composition G is applied between rolling and sliding faces of the first pinion teeth 321 and rolling and sliding faces of the first rack teeth 311 that are in contact with each other when the first pinion teeth 321 and the first rack teeth 311 mesh with each other, thereby lubricating both the rolling and sliding faces. The grease composition G is applied between a sliding face of the first sheet member 392 and a sliding face of the cylindrical face 312 that is the other part of the first rack toothed portion 310 of the rack shaft 31 in the circumferential direction, the sliding faces being in contact with each other when the first sheet member 392 and the rack shaft 31 are pressed against each other, thereby lubricating both the sliding faces. The grease composition G is applied between rolling and sliding faces of the second pinion teeth 541 and rolling and sliding faces of the second rack teeth 315 that are in contact with each other when the second pinion teeth 541 and the second rack teeth 315 mesh with each other, thereby lubricating both the rolling and sliding faces. The grease composition G is applied between a sliding face of the second sheet member 592 and a sliding face of the cylindrical face 313 that is the other part of the second rack toothed portion 314 of the rack shaft 31 in the circumferential direction, the sliding faces being in contact with each other when the second sheet member 592 and the rack shaft 31 are pressed against each other, thereby lubricating both the sliding faces.

The grease composition of the present disclosure is sealed as the grease composition G within the steering gear device 3 configured in this way. The grease composition of the present disclosure can satisfactorily lubricate the meshing portion between the first pinion teeth 321 and the first rack teeth 311, the meshing portion between the second pinion teeth 541 and the second rack teeth 315, the sliding contact portion between the first sheet member 392 of the first rack guide mechanism 39 and the rack shaft 31, and the sliding contact portion between the second sheet member 592 of the second rack guide mechanism 59 and the rack shaft 31. Therefore, the amounts of wear in these portions can be reduced.

(Column Type Electric Power Steering System)

Figure 4:
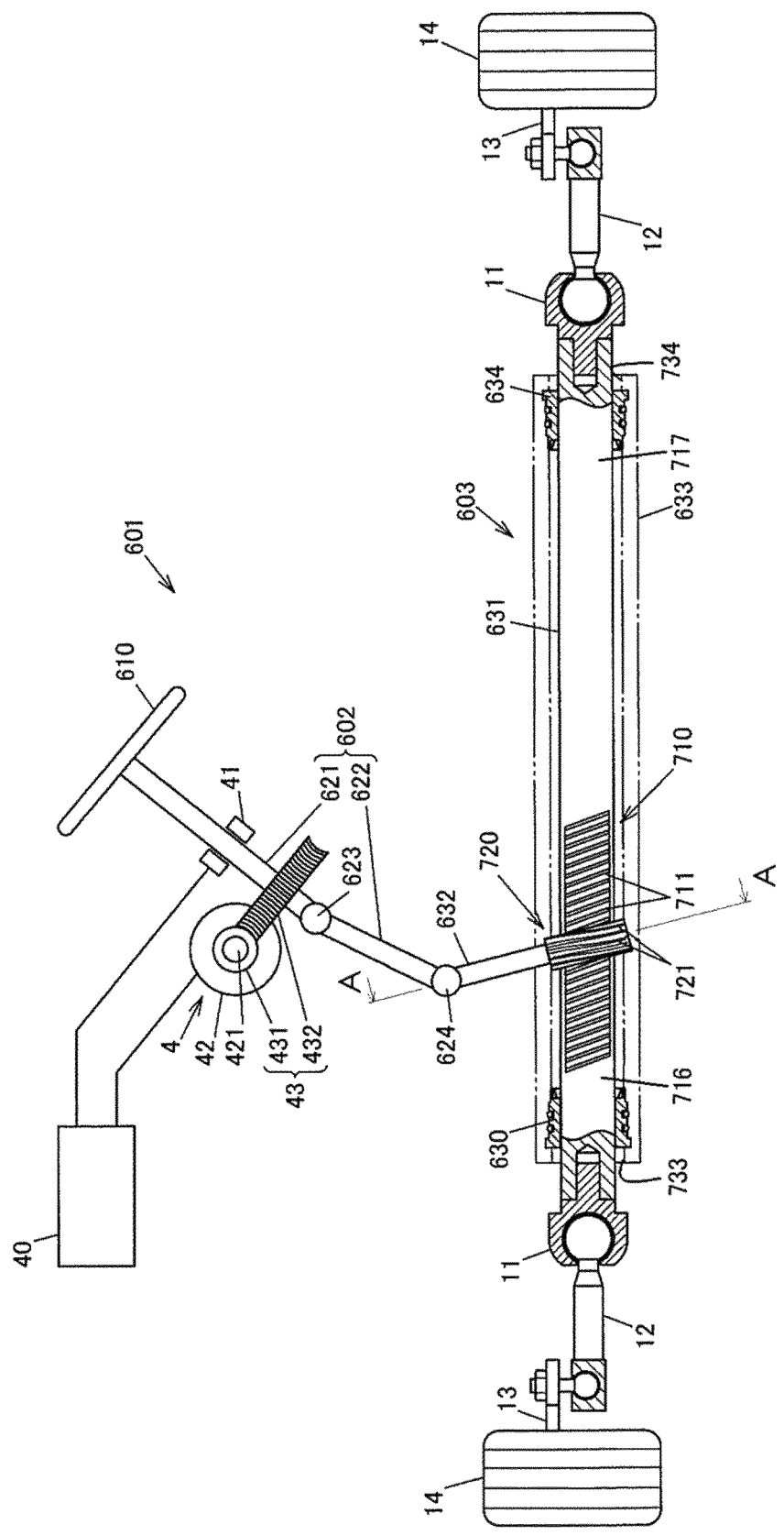
FIG. 4 is a configuration diagram schematically illustrating an example of a column type electric power steering system in which the grease composition of the present disclosure is sealed.

FIG. 4 is a configuration diagram schematically illustrating an example of a column type electric power steering system 601 including a steering gear device 603.

Figure 5:
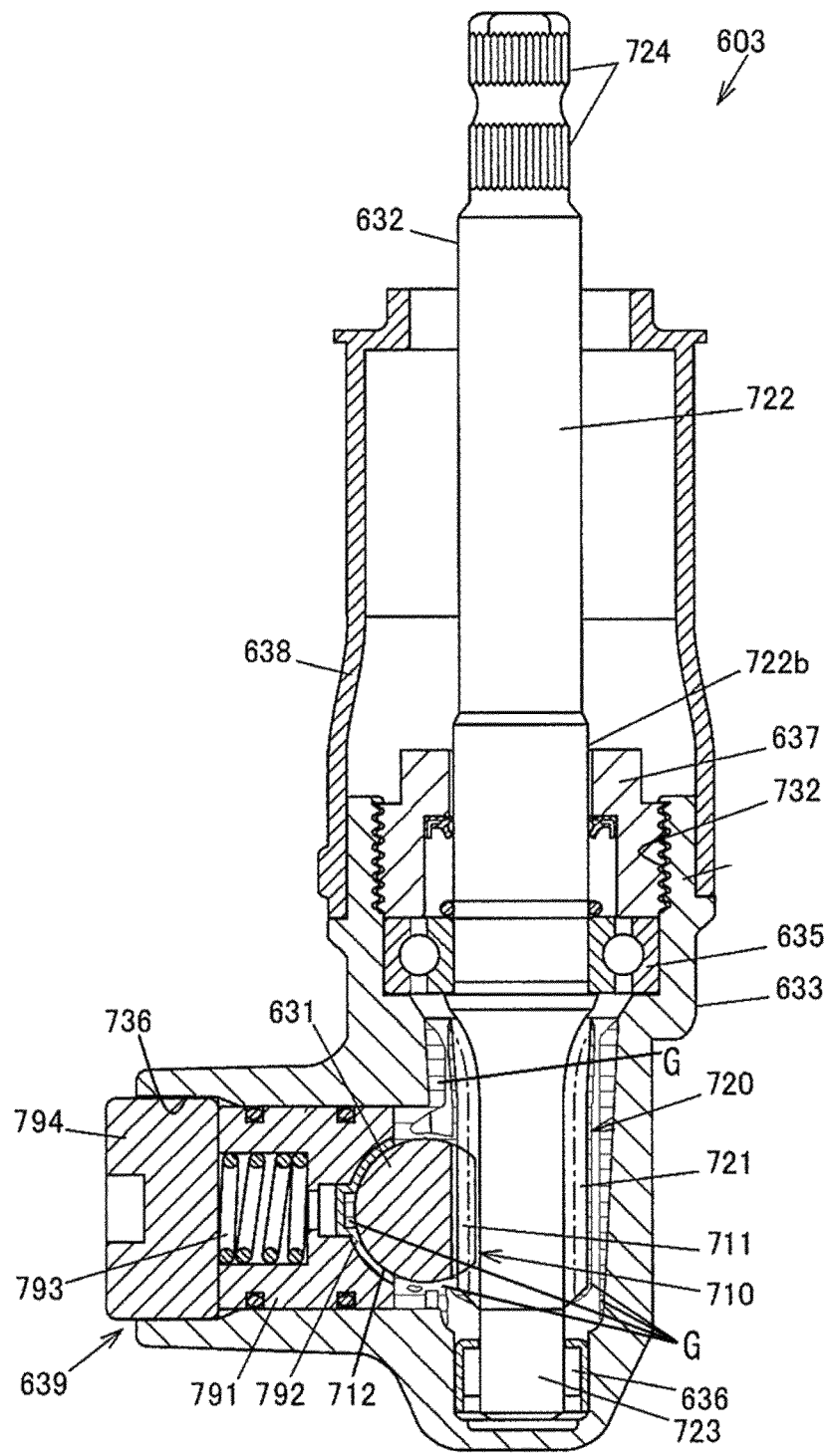
FIG. 5 is a sectional view taken along A-A in FIG. 4.

FIG. 5 is a sectional view taken along A-A in FIG. 4, illustrating part of the steering gear device 603. In FIG. 5, a lower side of the drawing corresponds to the lower side in the vertical direction when installed in the vehicle.

The column type electric power steering system 601 includes a steering wheel 610, a steering shaft 602, a pinion shaft 632, a rack shaft 631, a housing 633, two rack bushings 630 and 634, two bearings 635 and 636, a rack guide mechanism 639, and a steering assistance device 4. A driver who drives an automobile including the column type electric power steering system 601 performs steering operations by turning the steering wheel 610. The steering shaft 602 includes a column shaft 621, a first universal joint 623, an intermediate shaft 622, and a second universal joint 624. The first universal joint 623 includes a first yoke that is omitted from illustration, a plurality of first rolling elements that is omitted from illustration, a first joint spider that is omitted from illustration, a plurality of second rolling elements that is omitted from illustration, and a second yoke that is omitted from illustration. The second universal joint 624 includes a third yoke that is omitted from illustration, a plurality of third rolling elements that is omitted from illustration, a second joint spider that is omitted from illustration, a plurality of fourth rolling elements that is omitted from illustration, and a fourth yoke that is omitted from illustration.

The column shaft 621 fixes the steering wheel 610 at one end thereof in the extending direction. The column shaft 621 fixes the first yoke of the first universal joint 623 at the other end thereof in the extending direction. The column shaft 621 is rotatable about a central axis in the extending direction. The first yoke is pivotably fitted to a first pair of trunnions located on the same central axis of the first joint spider via the plurality of first rolling elements. The second yoke is pivotably fitted to a second pair of trunnions located on the same central axis of the first joint spider via the plurality of second rolling elements. The central axes of the first pair of trunnions and the central axes of the second pair of trunnions intersect at an angle of 90 degrees.

The second yoke of the first universal joint 623 fixes one end of the intermediate shaft 622 in the extending direction thereof. The intermediate shaft 622 fixes the third yoke of the second universal joint 624 at the other end thereof in the extending direction. The third yoke is pivotably fitted to a third pair of trunnions located on the same central axis of the second joint spider via the plurality of third rolling elements. The fourth yoke is pivotably fitted to a fourth pair of trunnions located on the same central axis of the second joint spider via the plurality of fourth rolling elements. The central axes of the third pair of trunnions and the central axes of the fourth pair of trunnions intersect at an angle of 90 degrees. The fourth yoke of the second universal joint 624 fixes one end of the pinion shaft 632 in the extending direction thereof. Thus, when the driver turns the steering wheel 610, the column shaft 621 turns about the central axis thereof in the extending direction thereof, the intermediate shaft 622 also turns about a central axis thereof in the extending direction thereof, and the pinion shaft 632 also turns about a central axis thereof in the extending direction thereof.

In the column type electric power steering system 601, the pinion shaft 632, the rack shaft 631, the housing 633, the two rack bushings 630 and 634, the two bearings 635 and 636, and the rack guide mechanism 639 constitute the steering gear device 603 that serves as a rack and pinion type steering device. In FIG. 4, the housing 633 is represented by a hidden outline (long dashed double-short dashed lines), and inside thereof is illustrated.

The pinion shaft 632 extends from the upper side to the lower side of the automobile in the vertical direction. The pinion shaft 632 includes, from one end side toward the other end in the extending direction thereof, a serrated portion 724, a shaft portion 722, a pinion toothed portion 720, and a boss portion 723. Serrations are formed in the serrated portion 724. The fourth yoke of the second universal joint 624 is fixed to the serrations of the serrated portion 724. The shaft portion 722 has a columnar shape. Pinion teeth 721 are formed over the entire face of the pinion toothed portion 720 in the circumferential direction. An extending direction of the pinion teeth 721 has an angle that is not 90 degrees with respect to the extending direction of the central axis of the pinion shaft 632. The boss portion 723 has a columnar shape.

The housing 633 has a first opening 732 on the steering wheel 610 side, and a side opposite to the first opening 732 is sealed off. The pinion shaft 632 is accommodated within the housing 633. The pinion shaft 632 is supported by the two bearings 635 and 636 so as to be rotatable relative to the housing 633. The bearing 635 is a ball bearing. The bearing 635 includes an inner ring, an outer ring, and balls, with the inner ring being fixed to the shaft portion 722 and also the outer ring being fixed to the housing 633, and the balls roll between the inner ring and the outer ring. The bearing 636 is a roller bearing. The bearing 636 includes rollers and an outer ring, with the outer ring being fixed to the housing 633, and the rollers roll between an outer peripheral face of the boss portion 723 and the outer ring.

A lid 637 through which the pinion shaft 632 passes is fixed to the first opening 732 of the housing in a state in which the pinion shaft 632 and the two bearings 635 and 636 are inserted into the housing 633. A seal is fixed to the lid 637, and the seal is slidable on an outer peripheral face 722b of the shaft portion 722 of the pinion shaft 632. A cover member 638 is further fixed to the housing 633. The cover member 638 covers part of the shaft portion 722 of the pinion shaft 632 from the outside in the radial direction.

The rack shaft 631 includes, from one end toward the other end in an extending direction thereof, a first columnar portion 716, a rack toothed portion 710, and a second columnar portion 717. The rack toothed portion 710 has rack teeth 711 formed on part thereof in the circumferential direction, and the other part thereof in the circumferential direction is a cylindrical face 712 having a central axis corresponding to the extending direction of the rack shaft 631. An outer peripheral face of the first columnar portion 716 and an outer peripheral face of the second columnar portion 717 are each a cylindrical face having a central axis corresponding to the extending direction of the rack shaft 631. The extending direction of the rack teeth 711 has an angle that is not 90 degrees with respect to the extending direction of the rack shaft 631.

The housing 633 extends in a direction different from that of the first opening 732 on the steering wheel 610 side, and has a second opening 733 at one end in the extending direction and a third opening 734 at the other end in the extending direction. The rack shaft 631 is accommodated within the housing 633 along the extending direction of the housing 633. One end of the rack shaft 631 in the extending direction thereof protrudes from the second opening 733 at one end of the housing 633 in the extending direction thereof. The other end of the rack shaft 631 in the extending direction thereof protrudes from the third opening 734 at the other end of the housing 633 in the extending direction thereof.

The first rack bushing 630 is fixed to one end of the housing 633 in the extending direction. The first rack bushing 630 is fixed to the housing 633 to adjoin the second opening 733. The first rack bushing 630 is slidable on the outer peripheral face of the first columnar portion 716 of the rack shaft 631. The second rack bushing 634 is fixed to the other end of the housing 633 in the extending direction. The second rack bushing 634 is fixed to the housing 633 to adjoin the third opening 734. The second rack bushing 634 is slidable on the outer peripheral face of the second columnar portion 717 of the rack shaft 631.

The pinion teeth 721 formed on the pinion toothed portion 720 of the pinion shaft 632 and the rack teeth 711 formed on the rack toothed portion 710 of the rack shaft 631 are in contact with each other so as to be rolling-slidable via the grease composition G. The pinion teeth 721 and the rack teeth 711 mesh with each other via the grease composition G. When the pinion shaft 632 turns relative to the housing 633 about the central axis in the extending direction thereof, the rack shaft 631 moves in the linear direction relative to the housing 633 in the extending direction of the housing 633.

The housing 633 is fixed to the automobile that is omitted from illustration, with the extending direction of the housing 633 aligned with a vehicle-width direction. Ball joint sockets 11, 11 are fixed to one end and the other end of the rack shaft 631, respectively, and tie rods 12, 12 connected to the ball joint sockets 11, 11, respectively, are connected to bearing rings of rolling bearings that rotatably support a pair of right and left front wheels 14, 14 via knuckle arms 13, 13. The linear movement of the rack shaft 631 in the extending direction of the housing 633 steers the right and left front wheels 14, 14 that are steered wheels.

The rack guide mechanism 639 is fixed to the housing 633. The housing 633 has a fourth opening 736 located on the cylindrical face 712 side that is the other part of the rack toothed portion 710 of the rack shaft 631 in the circumferential direction at a position where the pinion shaft 632 meshes with the rack shaft 631 in the extending direction.

The rack guide mechanism 639 includes a support yoke 791, a sheet member 792, a coil spring 793, and a plug 794. The sheet member 792 is interposed between the cylindrical face 712 that is the other part of the rack toothed portion 710 of the rack shaft 631 in the circumferential direction and the cylindrical face of the support yoke 791. The sheet member 792 is fixed to the support yoke 791. The sheet member 792 and the cylindrical face 712 that is the other part of the rack toothed portion 710 of the rack shaft 631 in the circumferential direction are in contact with each other so as to be slidable via the grease composition G. The sheet member 792 includes a metal layer of, for example, bronze and a resin layer of, for example, PTFE, and the resin layer is in contact with the cylindrical face 712 via the grease composition G. The plug 794 is fixed to the fourth opening 736 of the housing 633. The plug 794 is in contact with one end of the coil spring 793. The support yoke 791 is in contact with the other end of the coil spring 793. The coil spring 793 is shorter than a free length thereof in a state in which the plug 794 is fixed to the fourth opening 736. Thus, the sheet member 792 is pressed against the rack shaft 631 with respect to the housing 633.

The steering assistance device 4 includes a controller 40, a torque sensor 41 that detects steering torque applied by the driver to the steering wheel 610, an electric motor 42, and a speed reducing mechanism 43 that reduces the speed of rotational force of an output shaft 421 of the electric motor 42 and transmits the rotational force to the column shaft 621. The speed reducing mechanism 43 is an assembly in which a worm 431 that rotates together with the output shaft 421 of the electric motor 42 and a worm wheel 432 that rotates together with the column shaft 621 mesh with each other. A motor current is supplied to the electric motor 42 from the controller 40. The controller 40 controls the electric motor 42 based on the steering torque detected by the torque sensor 41, vehicle speed, etc., and applies the rotational force of the output shaft 421 of the electric motor 42 that is reduced in speed by the speed reducing mechanism 43 to the column shaft 621 as a steering assisting force.

The grease composition G is sealed within the housing 633. The grease composition G is applied between rolling and sliding faces of the pinion teeth 721 and rolling and sliding faces of the rack teeth 711 that are in contact with each other when the pinion teeth 721 and the rack teeth 711 mesh with each other, thereby lubricating both the rolling and sliding faces. The grease composition G is applied between a sliding face of the sheet member 792 and a sliding face of the cylindrical face 712 that is the other part of the rack toothed portion 710 of the rack shaft 631 in the circumferential direction, the sliding faces being in contact with each other when the sheet member 792 and the rack shaft 631 are pressed against each other, thereby lubricating both the sliding faces.

The grease composition of the present disclosure is sealed as the grease composition G within the steering gear device 603 configured in this way. The grease composition of the present disclosure can satisfactorily lubricate the meshing portion between the pinion teeth 721 and the first rack teeth 711, and the sliding contact portion between the sheet member 792 of the rack guide mechanism 639 and the rack shaft 631. Therefore, the amounts of wear in these portions can be reduced.

The grease composition of the present disclosure can be used by being sealed within the dual-pinion type electric power steering system, the column type electric power steering system, etc.

<Grease Composition>

A grease composition according to an embodiment of the present disclosure includes a base oil, a thickener, and an extreme pressure additive.

(Base Oil)

The base oil is a mixture containing poly-α-olefin (PAO) and trimellitate ester.

Examples of the poly-α-olefin include oligomerized or polymerized a-olefins such as 1-hexene, 1-octene, 1-nonene, 1-decene, 1-dodecene, and 1-tetradecene, and further hydrides thereof.

The poly-α-olefin is preferably PAO4 to PAO10 that are oligomerized 1-decene.

The base oil kinematic viscosity of the poly-α-olefin at 40° C. is preferably 20 to 60 mm$^2$/s. The base oil kinematic viscosity (40° C.) is more preferably 25 to 55 mm$^2$/s.

The trimellitate ester is preferably trimellitate triester. This is because the trimellitate triester is suitable for improving the heat resistance of the grease composition. Examples of the trimellitate triester include reaction products of trimellitic acid and monoalcohol having a carbon number of 6 to 18. Among these, a reaction product of trimellitic acid and monoalcohol having a carbon number of 8 and/or 10 is preferable. Specific examples of the trimellitate triester include tri-2-ethylhexyl trimellitate, tri-normal alkyl trimellitate (C8, C10), tri-isodecyl trimellitate, and tri-normal octyl trimellitate. As the trimellitate triester, one kind may be used alone or two or more kinds may be used in combination.

The base oil kinematic viscosity of the trimellitate triester at 40° C. is preferably 37 to 57 mm$^2$/s.

The proportion of the trimellitate ester to the total amount of the trimellitate ester and the poly-a-olefin is 10.0 mass % or more and 60.0 mass % or less.

Since the base oil contains 10 mass % or more of the trimellitate ester, the grease composition is easily adsorbed to the friction face of a lubricated member. When the proportion of the trimellitate ester in the base oil is 60 mass % or less in the grease composition, corrosion of the lubricated member due to the grease composition is avoided. When the proportion of ester oil is high, surrounding rubber parts may generally be corroded.

(Thickener)

The grease composition of the present disclosure contains lithium 12-hydroxystearate and lithium stearate as the thickener.

Although lithium stearate can be highly effective in reducing friction, it tends to increase torque at low temperature when used alone. Therefore, the grease composition uses lithium stearate and lithium 12-hydroxystearate in combination to suppress the torque increase at low temperature.

In the thickener, the proportion of lithium 12-hydroxystearate to the total amount of lithium 12-hydroxystearate and lithium stearate is 5.0 mass % or more and 95.0 mass % or less.

When the proportion of lithium 12-hydroxystearate is less than 5.0 mass %, there is a possibility that the effect of combined use cannot fully be achieved. When the proportion of lithium 12-hydroxystearate is more than 95.0 mass % as well, there is a possibility that the effect of combined use cannot fully be achieved.

The proportion of lithium 12-hydroxystearate to the total amount of lithium 12-hydroxystearate and lithium stearate is preferably 20.0 mass % or more and 75.0 mass % or less, and more preferably 25.0 mass % or more and 60.0 mass % or less.

(Extreme Pressure Additive)

The grease composition of the present disclosure contains molybdenum dialkyl dithiocarbamate as the extreme pressure additive.

Therefore, friction on the friction face of the lubricated member can be reduced by using the grease composition.

In the grease composition, the proportion of the molybdenum dialkyl dithiocarbamate (hereinafter also referred to as MoDTC) to the total amount of the trimellitate ester and the poly-α-olefin as the base oil, the lithium 12-hydroxystearate and the lithium stearate as the thickener, and the molybdenum dialkyl dithiocarbamate (hereinafter also referred to as MoDTC proportion) is 0.6 mass % or more and 16.0 mass % or less. This case is suitable for forming a tribo-reaction film on the friction face of the lubricated member. Therefore, wear of the friction face can be reduced.

When the MoDTC proportion is less than 0.6 mass %, the effect of

MoDTC addition cannot be obtained. When the MoDTC proportion is more than 16 mass %, the grease composition is hard and is less likely to penetrate into the friction face of the lubricated member.

The MoDTC proportion is preferably 1.0 mass % or more and 10.0 mass % or less, and more preferably 1.3 mass % or more and 8.3 mass % or less.

The MoDTC proportion that is 1.3 mass % or more and 8.3 mass % or less is particularly suitable for achieving both suppression of wear of the friction face of a lubricated member made of steel and suppression of wear of the friction face of a lubricated member made of resin such as fluororesin.

Examples of the MoDTC include a compound represented by the following formula (1).

[Chem. 1]

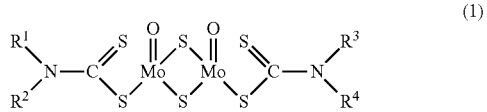

(1)

(In the formula, $R^1$ to $R^4$ each independently represent a linear or branched alkyl group.)

A commercially available product can also be used as the MoDTC. Examples of the commercially available product include ADEKA SAKURA-LUBE 200, ADEKA SAKURA-LUBE 165, ADEKA SAKURA-LUBE 525, and ADEKA SAKURA-LUBE 600 (all produced by ADEKA Corporation).

The grease composition may contain additives other than the extreme pressure additive as long as the effects of the invention of the present disclosure are not impaired. Examples of the other additives include antioxidants, rust inhibitors, anti-wear agents, dyes, hue stabilizers, viscosity improvers, structural stabilizers, metal deactivators, and viscosity index improvers.

When the grease composition contains other additives, the total content of the other additives in the grease composition is preferably 15 mass % or less with respect to the total mass of the base oil and the thickener.

The worked penetration of the grease composition is preferably No. 00 to No. 2.

By adjusting the worked penetration within this range, sufficient leakage resistance can be ensured when the grease composition is sealed within the steering gear device, and the grease composition can satisfactorily flow into the friction face of the lubricated member.

As described above, the grease composition of the present disclosure can suitably be used in the steering gear device of the automobile, etc.

The grease composition can also be used as a grease composition to be sealed within a rolling bearing etc.

<Method for Producing Grease Composition>

The above grease composition can be produced by mixing the components. Specifically, the grease composition can be produced through, for example, the following procedure.

(1) Lithium stearate and lithium 12-hydroxystearate are added to poly-a-olefin, and the mixture is heated with stirring (e.g., 230° C.) to dissolve the lithium stearate and the lithium 12-hydroxystearate in the poly-a-olefin.

(2) Then, the poly-a-olefin in which the lithium stearate and the lithium 12-hydroxystearate are dissolved is cooled. When it is cooled to a predetermined temperature (e.g., 150° C.), trimellitate ester is mixed and cooling is continued to precipitate the lithium stearate and the lithium 12-hydroxystearate. Thus, base grease is prepared.

After the cooling, homogenization treatment using a roll etc. may be performed as necessary.

(3) MoDTC and other additives to be contained as necessary are added to and mixed with the base grease prepared in step (2).

The above grease composition can be produced through such steps (1) to (3).

EXAMPLES

Next, the invention of the present disclosure will be described in more detail based on Examples, but the invention of the present disclosure is not limited to the Examples alone.

In the Examples and Comparative Examples, the following raw materials were used.

Base Oil:
  Poly-α-olefin: PAO8 (base oil kinematic viscosity of 46 mm²/s at 40° C.) Trimellitate ester: Trimex N-08NB (produced by Kao Corporation, trimellitate triester) Diester: SANSO CIZER DOS (produced by New Japan Chemical Co., Ltd.) Phthalate ester: SANSO CIZER DIDP (produced by New Japan Chemical Co., Ltd.)
Thickener:
  Lithium Stearate
  Lithium 12-hydroxystearate
Additive:
  Molybdenum dialkyl dithiocarbamate (MoDTC): SAKURA-LUBE 600 (produced by ADEKA Corporation)

Example 1

(1) Lithium stearate and lithium 12-hydroxystearate were each added at 6.0 parts by mass to 69.6 parts by mass of poly-α-olefin, and the mixture was heated to 230° C. with stirring to dissolve the lithium stearate and the lithium 12-hydroxystearate in the poly-α-olefin. Then, the mixture was cooled in still air with stirring, and 17.4 parts by mass of trimellitate ester were mixed at a timing when the mixture was cooled to 150° C. Then, the mixture was continuously cooled in still air with stirring to 60° C.

In this way, base grease in which the lithium stearate and the lithium 12-hydroxystearate were precipitated was prepared. In the base oil contained in this base grease, the mass ratio of the poly-a-olefin and the trimellitate ester is 4:1.

(2) Next, homogenization treatment was performed by using a triple roll mill. At this time, treatment conditions were as follows:
  Clearance between rolls: 50 μm
  Pressure between rolls: 1 MPa
  Rotational speed: 200 r/min Treatment temperature: 25° C.

(3) MoDTC was added at 1.0 part by mass to the homogenized base grease, and the mixture was mixed by using a planetary centrifugal mixer at a rotational speed of 2000 rpm for 3 minutes to complete a grease composition.

Example 2

A grease composition was completed in the same way as in Example 1 except that the amount of poly-a-olefin was 68.8 parts by mass, the amount of trimellitate ester was 17.2 parts by mass, and the amount of MoDTC was 2.0 parts by mass.

Example 3

A grease composition was completed in the same way as in Example 1 except that the amount of poly-a-olefin was 66.7 parts by mass, the amount of trimellitate ester was 16.7 parts by mass, the amounts of lithium stearate and lithium 12-hydroxystearate were each 5.8 parts by mass, and the amount of MoDTC was 5.0 parts by mass.

Example 4

A grease composition was completed in the same way as in Example 1 except that the amount of poly-a-olefin was 63.2 parts by mass, the amount of trimellitate ester was 15.8 parts by mass, the amounts of lithium stearate and lithium 12-hydroxystearate were each 5.5 parts by mass, and the amount of MoDTC was 10.0 parts by mass.

Example 5

A grease composition was completed in the same way as in Example 1 except that the amount of poly-a-olefin was 59.7 parts by mass, the amount of trimellitate ester was 14.9 parts by mass, the amounts of lithium stearate and lithium 12-hydroxystearate were each 5.2 parts by mass, and the amount of MoDTC was 15.0 parts by mass.

Example 6

(1) Lithium stearate and lithium 12-hydroxystearate were each added at 7.4 parts by mass to 41.6 parts by mass of poly-α-olefin, and the mixture was heated to 230° C. with stirring to dissolve the lithium stearate and the lithium 12-hydroxystearate in the poly-α-olefin.

Then, the mixture was cooled in still air with stirring, and 41.6 parts by mass of trimellitate ester were mixed at a timing when the mixture was cooled to 150° C. Then, the mixture was continuously cooled in still air with stirring to 60° C.

In this way, base grease in which the lithium stearate and the lithium 12-hydroxystearate were precipitated was prepared. In the base oil contained in this base grease, the mass ratio of the poly-α-olefin and the trimellitate ester is 1:1.

(2) After homogenization treatment was performed under the same conditions as in Example 1, 2.0 parts by mass of MoDTC were added to the base grease, and then the mixture was mixed under the same conditions as in Example 1 to complete a grease composition.

Comparative Example 1

(1) Lithium stearate and lithium 12-hydroxystearate were each added at 5.5 parts by mass to 89.0 parts by mass of poly-α-olefin, and the mixture was heated to 230° C. with stirring to dissolve the lithium stearate and the lithium 12-hydroxystearate in the poly-α-olefin. Then, the mixture was cooled in still air with stirring to 60° C. to precipitate the lithium stearate and the lithium 12-hydroxystearate.

Further, homogenization treatment was performed under the same conditions as in Example 1 to complete a grease composition.

Comparative Example 2

(1) Lithium stearate and lithium 12-hydroxystearate were each added at 6.1 parts by mass to 70.2 parts by mass of poly-α-olefin, and the mixture was heated to 230° C. with stirring to dissolve the lithium stearate and the lithium 12-hydroxystearate in the poly-α-olefin. Then, the mixture was cooled in still air with stirring, and 17.6 parts by mass of trimellitate ester were mixed at a timing when the mixture was cooled to 150° C. Then, the mixture was continuously cooled in still air with stirring to 60° C. to precipitate the lithium stearate and the lithium 12-hydroxystearate.

Further, homogenization treatment was performed under the same conditions as in Example 1 to complete a grease composition.

Comparative Example 3

(1) Lithium stearate and lithium 12-hydroxystearate were each added at 5.4 parts by mass to 87.2 parts by mass of poly-α-olefin, and the mixture was heated to 230° C. with stirring to dissolve the lithium stearate and the lithium 12-hydroxystearate in the poly-α-olefin. Then, the mixture was cooled in still air with stirring to 60° C. to prepare base grease in which the lithium stearate and the lithium 12-hydroxystearate were precipitated.

(2) After homogenization treatment was performed under the same conditions as in Example 1, 2.0 parts by mass of MoDTC were added to the base grease, and then the mixture was mixed under the same conditions as in Example 1 to complete a grease composition.

Comparative Example 4

A grease composition was completed in the same way as in Example 1 except that the amount of poly-α-olefin was 69.8 parts by mass, the amount of trimellitate ester was 17.5 parts by mass, the amounts of lithium stearate and lithium 12-hydroxystearate were each 6.1 parts by mass, and the amount of MoDTC was 0.5 parts by mass.

Comparative Example 5

A grease composition was completed in the same way as in Example 6 except that diester was used instead of trimellitate ester.

Comparative Example 6

A grease composition was completed in the same way as in Example 6 except that phthalate ester was used instead of trimellitate ester.

The grease compositions produced in the Examples and Comparative Examples were subjected to a friction and wear test to evaluate wear resistance under a poor lubrication environment. Two types of friction and wear test were carried out by using test pieces made of different materials. The results are shown in Table 3 and FIG. 6.

(Friction and Wear Test 1)

The test was carried out in conformity with the ASTM D5707 standard. An SRV2 vibration friction and wear tester (manufactured by OPTIMOL) was used as the test device.

In this test, a cylindrical roller for bearings made of SUJ2 (Ø15 mm×22 mm, Ra 0.1 μm) was used as an upper test piece, and a flat plate made of SUJ2 (@24 mm×7.8 mm, Ra 0.2 μm) was used as a lower test piece.

In this test, the upper test piece was caused to reciprocate along the axial direction of the cylindrical roller for 10 minutes while being pressed against the lower test piece with a load of 250 N, and the width of a wear mark formed on the flat plate was measured.

Details of the test conditions are shown in Table 1.

TABLE 1

| Test pieces | | Conditions |
|---|---|---|
| Test pieces | Upper | Cylindrical roller for bearings (SUJ2, Φ15 mm × 22 mm) Ra 0.1 μm |
| | Lower | Flat plate (SUJ2, Φ24 mm × 7.8 mm) Ra 0.2 μm |
| Grease application thickness | | 0.05 mm |
| Temperature | | 120° C. |
| Amplitude | | 1.0 mm |
| Frequency | | 50 Hz |
| Pre-conditioning operation | | 50N × 30 sec |
| Load | | 250N |
| Test duration | | 10 min |
| Evaluation item | | Wear mark width on flat plate |
| Applied standards | | Test conforming to ASTM D5707 |
| Measuring device | | SRV2 vibration friction and wear tester (OPTIMOL) |

(Friction and Wear Test 2)

The grease compositions were evaluated in the same way as in Friction and Wear Test 1 except for the following changes.

The upper part of the lower test piece was changed to a PTFE sheet (Ø24 mm×16 mm, Ra 0.5 μm).

The load for pressing the upper test piece against the lower test piece was changed to 100 N.

The test duration was changed to 60 minutes.

Details of the test conditions are shown in Table 2.

TABLE 2

| | | Conditions |
|---|---|---|
| Test pieces | Upper | Cylindrical roller for bearings (SUJ2, Φ15 mm × 22 mm) Ra 0.1 μm |
| | Lower | Flat plate (PTFE sheet) |
| Grease application thickness | | 0.05 mm |
| Temperature | | 120° C. |
| Amplitude | | 1.0 mm |
| Frequency | | 50 Hz |
| Pre-conditioning operation | | 50N × 30 sec |
| Load | | 100N |
| Test duration | | 60 min |
| Evaluation item | | Wear mark width on flat plate |
| Applied standards | | Test conforming to ASTM D5707 |
| Measuring device | | SRV2 vibration friction and wear tester (OPTIMOL) |

TABLE 3

| | | Unit | Example 1 | Example 2 | Example 3 | Example 4 | Example 5 | Example 6 | Comparative Example 1 |
|---|---|---|---|---|---|---|---|---|---|
| Base oil | Poly-α-olefin | mass % | 69.6 | 68.8 | 66.7 | 63.2 | 59.7 | 41.6 | 89.0 |
| | Trimellitate ester | mass % | 17.4 | 17.2 | 16.7 | 15.8 | 14.9 | 41.6 | — |
| | Diester | mass % | — | — | — | — | — | — | — |
| | Phthalate ester | mass % | — | — | — | — | — | — | — |
| Thickener | Lithium stearate | mass % | 6.0 | 6.0 | 5.8 | 5.5 | 5.2 | 7.4 | 5.5 |
| | Lithium 12-hydroxystearate | mass % | 6.0 | 6.0 | 5.8 | 5.5 | 5.2 | 7.4 | 5.5 |
| Extreme pressure additive | Molybdenum dialkyl dithiocarbamate | mass % | 1.0 | 2.0 | 5.0 | 10.0 | 15.0 | 2.0 | — |
| Wear amount under poor lubrication environment | SUJ2 | mm | 0.17 | 0.16 | 0.16 | 0.21 | 0.23 | 0.17 | 0.34 |
| | PTFE | mm | 0.52 | 0.47 | 0.42 | 0.55 | — | 0.47 | 0.59 |

| | | Unit | Comparative Example 2 | Comparative Example 3 | Comparative Example 4 | Comparative Example 5 | Comparative Example 6 |
|---|---|---|---|---|---|---|---|
| Base oil | Poly-α-olefin | mass % | 70.2 | 87.2 | 69.8 | 41.6 | 41.6 |
| | Trimellitate ester | mass % | 17.6 | — | 17.5 | — | — |
| | Diester | mass % | — | — | — | 41.6 | — |
| | Phthalate ester | mass % | — | — | — | — | 41.6 |
| Thickener | Lithium stearate | mass % | 6.1 | 5.4 | 6.1 | 7.4 | 7.4 |
| | Lithium 12-hydroxystearate | mass % | 6.1 | 5.4 | 6.1 | 7.4 | 7.4 |
| Extreme pressure additive | Molybdenum dialkyl dithiocarbamate | mass % | — | 2.0 | 0.5 | 2.0 | 2.0 |
| Wear amount under poor lubrication environment | SUJ2 | mm | 0.28 | 0.26 | 0.28 | 0.25 | 0.35 |
| | PTFE | mm | 0.52 | 0.57 | — | — | — |

Figure 6:
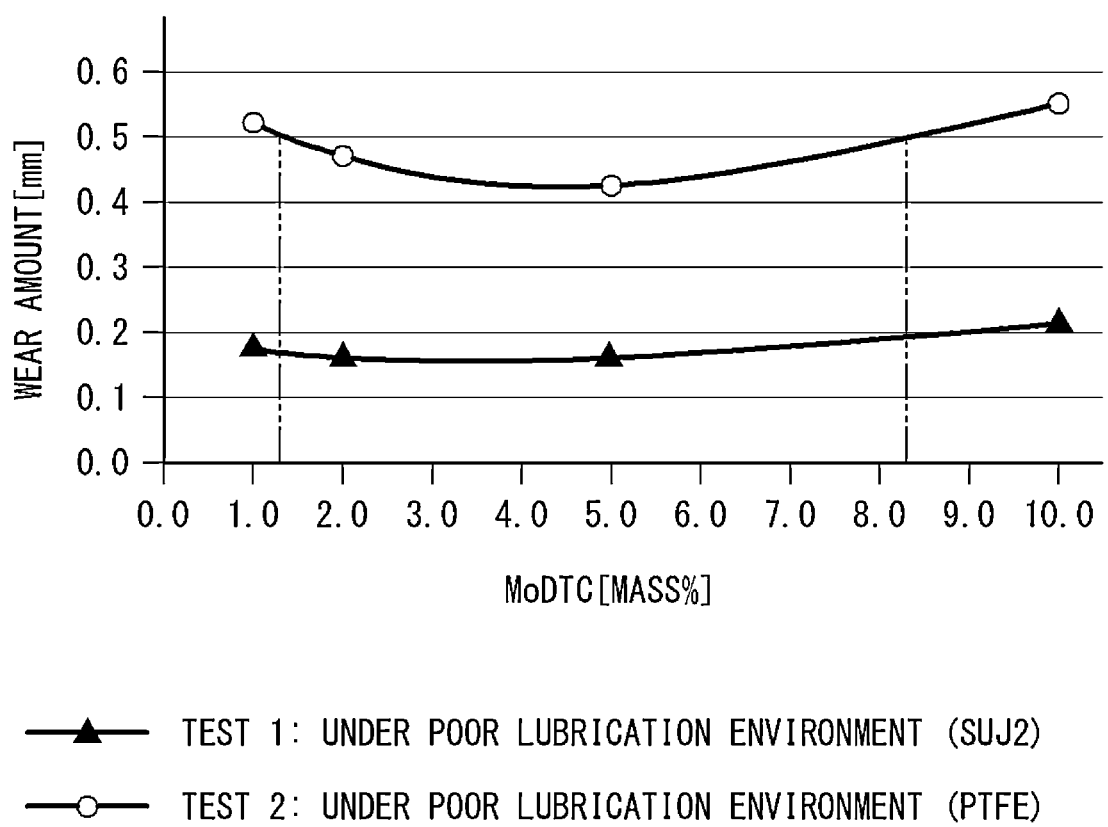
FIG. 6 is a graph illustrating evaluation results of Examples and Comparative Examples.

As shown in the results in Tables 2 and 3, it was found that the grease composition according to the embodiment of the present disclosure reduced the amount of wear on the friction face of a lubricated member under the poor lubrication environment. As shown in the graph of FIG. 6, it was found that, by setting the MoDTC proportion to 1.3 mass % or more and 8.3 mass % or less, the wear amount in Friction and Wear Test 1 was 0.2 mm or less and the wear amount in Friction and Wear Test 2 was 0.5 mm or less.

DESCRIPTION OF THE REFERENCE NUMERALS

1 . . . dual-pinion type electric power steering system, 2 . . . steering shaft, 3 . . . steering gear device, 33 . . . housing, 31 . . . rack shaft, 310 . . . first rack toothed portion, 311 . . . first rack tooth, 312 . . . cylindrical face, 313 . . . cylindrical face, 314 . . . second rack toothed portion, 315 . . . second rack tooth, 32 . . . first pinion shaft, 320 . . . first pinion toothed portion, 321 . . . first pinion tooth, 392 . . . first sheet member, 54 . . . second pinion shaft, 540: second pinion toothed portion, 541: second pinion tooth, 592: second sheet member, 601 . . . column type electric power steering system, 602: steering shaft, 603 . . . steering gear device, 633 . . . housing, 631 . . . rack shaft, 710 . . . rack toothed portion, 711 . . . rack tooth, 712 . . . cylindrical face, 632 . . . pinion shaft, 720 . . . pinion toothed portion, 721 . . . pinion tooth, 792 . . . sheet member, G grease composition

The invention claimed is:

1. A grease composition comprising
a base oil, a thickener, and an extreme pressure additive, wherein
the base oil contains trimellitate ester and poly-α-olefin,
a proportion of the trimellitate ester to a total amount of the trimellitate ester and the poly-α-olefin is 10.0 mass % or more and 60.0 mass % or less,
the thickener contains lithium 12-hydroxystearate and lithium stearate,
a proportion of the lithium 12-hydroxystearate to a total amount of the lithium 12-hydroxystearate and the lithium stearate is 5.0 mass % or more and 95.0 mass % or less,
the extreme pressure additive contains molybdenum dialkyl dithiocarbamate, and
a proportion of the molybdenum dialkyl dithiocarbamate to a total amount of the trimellitate ester, the poly-α-olefin, the lithium 12-hydroxystearate, the lithium stearate, and the molybdenum dialkyl dithiocarbamate is 0.6 mass % or more and 16.0 mass % or less.

2. The grease composition according to claim 1, wherein the proportion of the molybdenum dialkyl dithiocarbamate to the total amount of the trimellitate ester, the poly-α-olefin, the lithium 12-hydroxystearate, the lithium stearate, and the molybdenum dialkyl dithiocarbamate is 1.3 mass % or more and 8.3 mass % or less.

3. A steering gear device comprising:
a housing;
a rack shaft including rack teeth and configured to reciprocate along an axial direction;
a pinion shaft including pinion teeth that mesh with the rack teeth;
a rack guide mechanism that urges the rack teeth against the pinion teeth; and
a grease composition applied between the rack teeth and the pinion teeth that mesh with each other, and between a peripheral face of the rack shaft and a portion of the rack guide mechanism that is pressed against the rack shaft, wherein the grease composition is the grease composition according to claim 1.

4. The grease composition according to claim 1, wherein a worked penetration of the grease composition is No. 00 to No. 2.

* * * * *